(12) United States Patent
Morgan et al.

(10) Patent No.: US 6,958,676 B1
(45) Date of Patent: Oct. 25, 2005

(54) VEHICLE PASSENGER AUTHORIZATION SYSTEM

(75) Inventors: Douglas E. Morgan, Springfield, VA (US); Ted G. Morgan, Bethesda, MD (US); Joseph R. Child, Alexandria, VA (US)

(73) Assignee: STS International LTD, Berkeley Springs, WV (US)

( * ) Notice: Subject to any disclaimer, the term of this patent is extended or adjusted under 35 U.S.C. 154(b) by 276 days.

(21) Appl. No.: 10/359,389

(22) Filed: Feb. 6, 2003

Related U.S. Application Data (60) Provisional application No. 60/389,952, filed on Jun. 20, 2002, provisional application No. 60/382,339, filed on May 23, 2002, provisional application No. 60/375,396, filed on Apr. 26, 2002, provisional application No. 60/354,219, filed on Feb. 6, 2002.

(51) Int. Cl.[7] .................. B60R 25/00; G05B 19/00; G06F 7/00; G08B 29/00; H04B 1/00
(52) U.S. Cl. .................. 340/5.72; 340/933; 340/928; 235/380
(58) Field of Search .................. 340/5.72, 5.8–5.84, 340/933, 902–906, 928, 909, 915, 918, 464–467; 235/380, 384, 492

(56) References Cited

U.S. PATENT DOCUMENTS

| | | | | |
|---|---|---|---|---|
| 5,310,999 A | * | 5/1994 | Claus et al. | 235/384 |
| 5,485,520 A | * | 1/1996 | Chaum et al. | 705/74 |
| 5,488,360 A | * | 1/1996 | Ray | 340/933 |
| 5,777,565 A | * | 7/1998 | Hayashi et al. | 340/928 |
| 5,812,067 A | * | 9/1998 | Bergholz et al. | 340/5.52 |
| 5,886,634 A | * | 3/1999 | Muhme | 340/572.1 |
| 5,940,481 A | * | 8/1999 | Zeitman | 705/13 |
| 6,052,068 A | * | 4/2000 | Price R-W et al. | 340/933 |
| 6,360,953 B1 | * | 3/2002 | Lin et al. | 235/492 |
| 6,707,374 B1 | * | 3/2004 | Zaharia | 340/5.31 |

* cited by examiner

*Primary Examiner*—Michael Horabik
*Assistant Examiner*—Nam Nguyen
(74) *Attorney, Agent, or Firm*—Steptoe & Johnson PLLC

(57) ABSTRACT

A system for authorizing vehicle and passenger entry into a secure area while the vehicle is moving is disclosed. The vehicle passenger authorization system verifies the identity of the vehicle and its occupants while the vehicle is moving, thereby eliminating the need for the vehicle to stop as it approaches a secure area. Vehicle imaging technology is used to identify the vehicle. Biometric technology is used to confirm the identity of the occupants of the vehicle. By combining the biometric information of the occupants with the vehicle identification, an efficient and safe means for automatically controlling the flow of traffic into secured areas is disclosed.

18 Claims, 5 Drawing Sheets

VEHICLE PASSENGER AUTHORIZATION SYSTEM

CROSS-REFERENCE TO RELATED APPLICATIONS

This application claims priority to U.S. provisional patent application Nos. 60/354,219 filed Feb. 6, 2002; 60/375,396 filed Apr. 26, 2002; 60/382,339 filed May 23, 2002; and 60/389,952 filed Jun. 20, 2002.

BACKGROUND OF THE INVENTION

1. Field of Invention

This invention relates to security systems, and, more particularly, to a system for identifying and authenticating a vehicle and its passengers before allowing entry into a secure area.

2. Related Art

Entry points to secure facilities, such as military bases, commonly use require manned gateways to check person identification and prevent access by unauthorized personnel. Historically, this has involved guards who personally verify people's identity. This manual practice has many suitable applications, particularly where the level of security is not high and only a limited set of people are authorized to enter. However, if security regulations require use of rigorous authorization procedures, and if the number of people entering is large and personally unfamiliar to the guards, the time necessary to complete authorizations may result in excessive delays. Furthermore, authorization based on human observations is prone to human error.

A number of technologies exist that can enhance personnel authorization processes for security purposes. Many of them have been implemented using fingerprint readers, facial recognition systems, and other forms of biometric sensing. Unfortunately, many of these implementations require the person being screened to physically approach sensing devices and submit themselves physically for examination. At a vehicle entrance point, this means either exiting the vehicle or having the sensor input devices brought to the vehicle for the passenger(s) to provide input. In both cases the vehicle must come to a stop. Queues of vehicles can form as a function of the time to process each vehicle and the number of vehicles attempting to pass through. In this respect, the stationary use of biometrics technology will not improve traffic flow through a security checkpoint. Thus, there is a need for a system that combines biometrics sensing and communication linkage with moving vehicles passing through a security checkpoint without stopping.

SUMMARY OF THE INVENTION

The present invention solves the problems encountered at conventional security gates by providing an automated system that authorizes entry into a secured area based on vehicle and passenger identification that occur while the vehicle is approaching the gate. As a result, the vehicle need not stop in order to verify the identification of the vehicle and its occupants.

The invention is a physical security authorization system based on biometric and vehicle imaging data that is collected and processed in real time. The invention identifies personnel while they are in motion so vehicles can pass through a checkpoint without having to stop. The invention is usable by people in vehicles or walking. The invention tracks vehicles and assumes identified individual passengers remain in the vehicles throughout the authorization and access procedures.

The invention contains multiple physical zones through which a vehicle must pass. The zones are used to alert the passengers to the security requirements and manage the authorization process using procedures that control the flow of traffic while avoiding vehicle accidents when security violations occur. The invention uses a voice recognition system to achieve biometrics identification of personnel in a moving vehicle. The invention also includes enhanced fingerprint biometrics measuring for identification of personnel in a moving vehicle.

Biometrics technology is used to uniquely identify an individual. The most commonly used metrics are fingerprints, images of the iris (one or two eyes), and facial images. The facial images can be visual or infrared. For the application of biometrics in the vehicle passenger authorization system (VPAS), fingerprint data preferably is used. In the event that a driver wishes to covertly advise the VPAS that a threat exists, a sensor can be caused to malfunction thereby signaling to the system that a threat is present. Signage can ask the driver to resubmit for verification without alerting the intruder. A second malfunction can be interpreted by VPAS as a security alert with appropriate action being taken.

In the present invention, fingerprints are read by a device within the vehicle. The transmission of the fingerprint data is accomplished using a number of standard radio and/or optical communications technologies. The vehicle equipment is designed for transmission only, using visual signage to communicate with the driver for the return link to the vehicle. This reduces the cost oaf the in-vehicle equipment.

The data rate required to upload the biometrics data is low. This allows implementation of low cost solutions. The biometrics device in the vehicle preferably is energized using RF energy from a stationary transmitter. The biometrics device in the vehicle has an antenna designed to receive RF energy from the transmitter, convert it into electrical power, which is then used to operate the electronics of the device, including the biometric measuring device. The user is presented with an audible or visual indicator when the device has converted enough of the RF energy into power stored in the device fro it to operate. The user then places a thumb on the biometrics fingerprint reader pad on the device. The device automatically reads the fingerprint and transmits the biometric data. Low power logic devices operating on a few nanowatts are available from chip manufacturers for constructing such a device. Using external RF to power the device eliminates the requirement for an internal battery. The biometric data is transmitted from the vehicle to a receiver located nearby. Data is transmitted in packets that contain the identity of the person entering data, and where implemented vehicle data. The transmitted data is passed to the VPAS computer for analysis.

VPAS is designed to authenticate a driver and his vehicle. VPAS can also assists in preventing unauthorized personnel or vehicles from entering. In order to authenticate all the occupants of a vehicle, VPAS must be able to determine the number within the vehicle. When biometric data is being entered, VPAS counts the number of unique entries that take place. This value is subsequently used to determine admissibility of the vehicle when it passes through later zones in the multi-zone staging area.

EMBODIMENTS OF THE INVENTION

Figure 1:
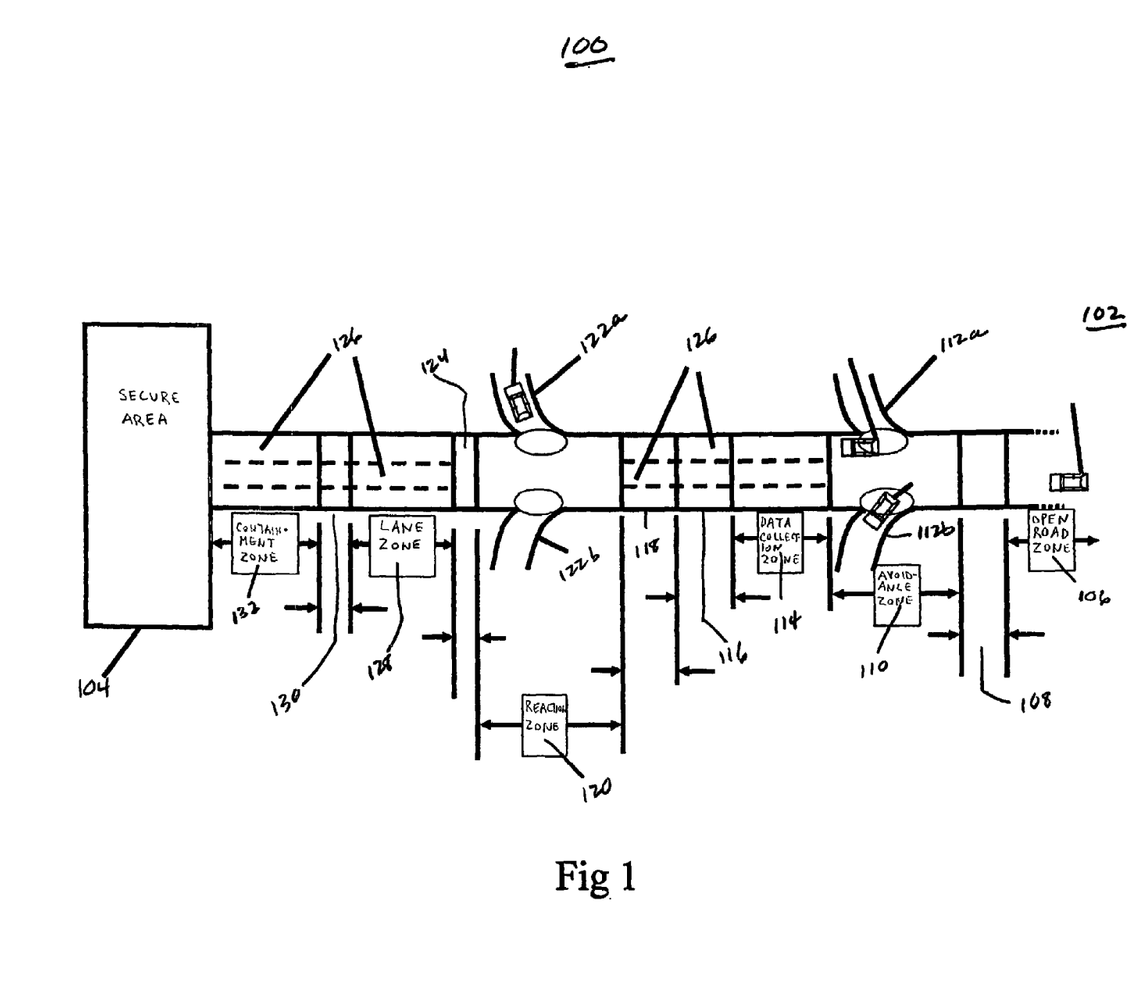
FIG. 1 shows an embodiment of the multi-zone staging area of the present invention.

FIG. 1 shows one of many alternative embodiments of a vehicle passenger authorization system (VPAS) 100 of the present invention. The VPAS 100 includes a multi-zone staging area 102 (staging area) for regulating traffic flow. In a preferred embodiment, a vehicle must pass through each zone of staging area 102 in order to gain access to secure area 104. The staging area 102 optionally but preferably includes the following zones:

Open Road Zone 106 is a public road preferably having multiple traffic lanes.

Alert Zone 108 is sign posted to advise vehicle drivers that the vehicle is about to enter a restricted area. Vehicles can be counted electromechanically in this zone as a means of determining how many vehicles inadvertently enter the zone.

Avoidance Zone 110 allows drivers to exit the VPAS 100 via exits 112a or 112b. The avoidance zone 110 is sign posted with exit signs for directing vehicles back to public roads or to a non-secured area such as a visitor center. At the end of avoidance zone 110, a vehicle driver selects one of the available lanes in data collection zone 114. Physical sensors preferably are mounted at the entrance to avoidance zone 110 to sense the height and width of entering vehicles. If a vehicle exceeds the height and weight standards of the VPAS 100, the driver is warned to exit the system via exits 112a or 112b. Alternatively, the driver may be directed to a specific lane reserved for oversized or special vehicles. Such a lane preferably is manned by live security personnel and is available to handle other types of exceptions as well.

Data Collection Zone 114 senses the vehicle's presence using industry standard vehicle sensing technology. The presence of a vehicle causes the VPAS 100 to alert the driver that it is time to provide biometric data. Passive signage can be used to provide the same instruction. The instruction may be a static sign illuminated by a flashing light set off by the vehicle sensor. Alternatively, the instruction can be presented using a more detailed alpha-numeric display. Simple or complex messages can be provided to the driver via such electronic signage. If more than one person is in the vehicle, each can be required to enter biometric data. The VPAS 100 data collection zone 114 is long enough to request multiple data entries prior to leaving the zone. If the VPAS 100 determines that the data received is flawed, insufficient, or missing, the vehicle still may be permitted to proceed—such a vehicle can be stopped in subsequent zones for further authorization procedures.

Analysis Zone 16. While the vehicle is passing through analysis zone 116, the VPAS 100 analyzes the biometric and vehicle data collected in data collection zone 114. Because of the time required to analyze the collected data, analysis zone 116 is sufficiently long to permit the VPAS 100 to complete its data analysis before the vehicle exits analysis zone 116. The lanes of analysis zone 116 can be made sinuous so as to slow vehicles down.

Clearance Zone 118. By the time the vehicle reaches clearance zone 118, the VPAS 100 is ready to report further instructions to the driver. There are numerous possible instructions depending on the complexity of the analysis. For example, VPAS 100 can be programmed to reject a vehicle based on its identification, e.g., the vehicle identified may be an unknown vehicle or it may be a known threat. The VPAS 100 is designed to entrap, reject, or accept a vehicle based on the results of the biometrics data or vehicle image analysis. The VPAS 100 can flash a denial alert to the driver or instructions to proceed. The instruction is issued in a lane specific manner so only the intended driver is given the alert. This is done using directional illumination or baffles that prevent viewing from adjacent lanes.

Reaction Zone 120. If the driver of a vehicle is issued a denied alert in clearance zone 118, he or she can exit the system via exits 122a or 122b. Exits 122a and 122b lead back to public roads or non-secured areas such as a residential area or a visitor center. Reaction zone 120 can be restricted to a single lane with a moveable gateway that is operated by the VPAS 100 to force the driver to exit either at exit 122a or 122b.

Lane Selection Zone 124 is a "point of no return." Once a vehicle passes exits 122a and 122b, it must pass through all subsequent zones eventually entering zone 104. If a vehicle has full authorization to proceed, all gates are prospectively opened. Lanes 126 in lane zone 128 that are blocked for any reason are so marked and the drivers manually select an open lane and proceed. The driver's selection of a lane is similar to the process of lane selection at a tollgate on a multi-lane toll road.

Lane Zone 128 consists of multiple one way traffic lanes 126 separated by barriers. Sensors at the entrance of each lane 126 in lane zone 128 determine the identity of each vehicle as it enters the lane 126. This vehicle identification preferably is achieved using intelligent transponders on vehicles or vehicle matching images taken at the entrances to lane zone 128 and data collection zone 114. Lane zone 128 confines vehicles to a given lane. Using a tunnel structure for passage along the lanes of lane zone 128, it is possible to implement other forms of vehicle inspection such as drug detection. The vehicle position also is sufficiently well known to conduct three dimensional infrared scanning to determine the number of people in the vehicle.

Advisory Zone 130. As a driver approaches the end of zone 128, he or she is advised of the vehicle's status and has an option to stop. If access has been denied, the driver may require assistance and can stop to communicate with authorities via suitable means such as speakerphone. This provides a procedure for entry when the VPAS 100 has not authorized entry, yet entry is to be approved.

Containment Zone 132 is a means for restraining a vehicle that is not authorized to enter secure area 104. Containment zone 132 preferably is equipped with various standard forms of constraint, both benign (e.g., raised surface bumps—increasingly higher along the lane) and destructive (e.g., tire spikes or electromagnetic pulse). The constraints are activated based on the analysis conducted and can be operated automatically or remotely by appropriate personnel. The lanes 126 in containment zone 132 preferably are bordered with containment walls that provide protection in the case of hostile action. Containment zone 132 preferably includes a means for detecting personnel exiting a vehicle and leaving containment zone 132 back through advisory zone 130. Alternatively, personnel confinement techniques can be activated based on the security requirements and threat scenario.

Secured Area 104 is the area being protected by the VPAS 100. If an unauthorized vehicle has entered containment zone 132, it can be directed within zone 104 (e.g., manually) as appropriate. For example, some people may not understand the VPAS 100 and may have passed through the entire system without proper biometric capability. In such a case, provisions can be made within zone 104 for vehicles to exit via containment zone 132.

In operation, a vehicle approaches the staging area 102 via open road zone 106. From open road zone 106, the vehicle enters alert zone 108. In alert zone 108 the vehicle driver is given visual indications that the vehicle is entering a restricted area and will be personally investigated before being allowed to access secured area 104. In avoidance zone 110, the driver has a last chance to exit the staging area 102 via exits 112 without VPAS 100 interrogating the vehicle occupants or sensing the vehicle.

Figure 2:
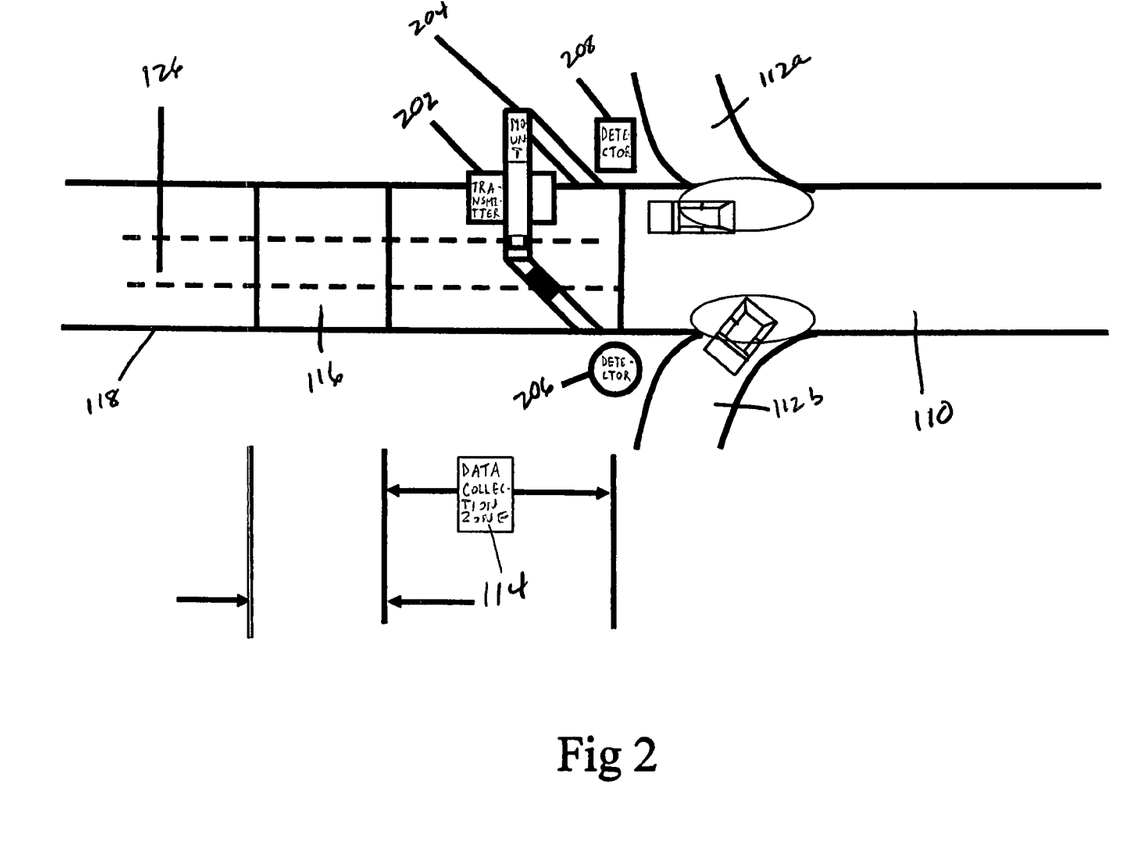
FIG. 2 shows a passive radio frequency energy transmission system which is used to power vehicle mounted equipment.
Figure 3:
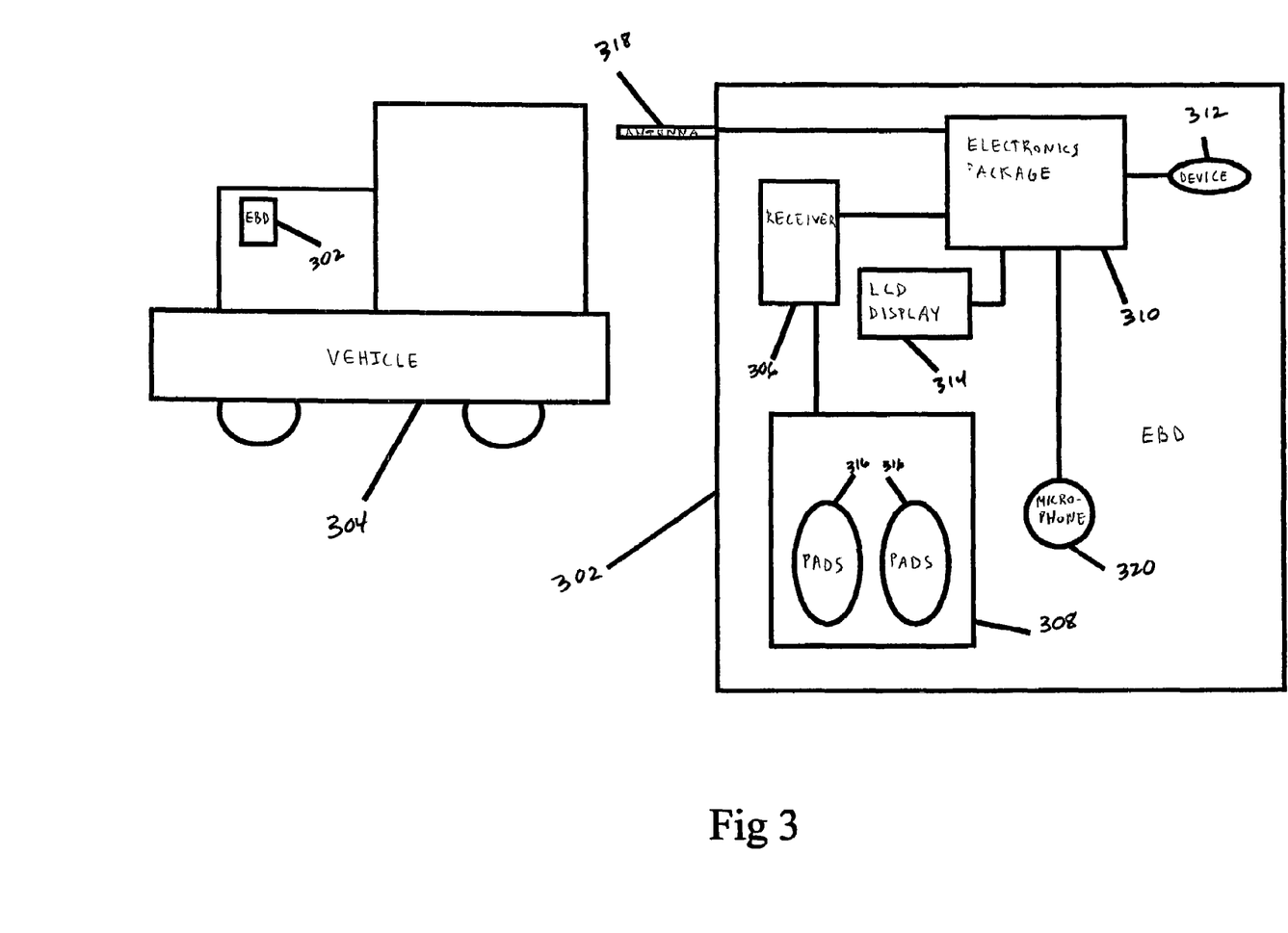
FIG. 3 shows a fingerprint reader, communications link, and acoustical microphone of a biometrics input device mounted in a vehicle.

When a vehicle enters data collection zone 114, the presence of the vehicle is detected using a vehicle sensor system. The detection can be achieved using an infrared beam across the roadway of data collection zone 114. Infrared emitter 206 sends a beam to detector 208. When a vehicle enters data collection zone 114, the beam from passing from emitter 206 to detector 208 is interrupted. The loss of infrared signal indicates the presence of a vehicle. This information causes transmitter 202 to begin transmitting. Once activated, transmitter 202 continually transmits RF energy until the infrared signal reappears at detector 206 and a timeout period has elapsed. While transmitting, transmitter 202 emits both continual energy to power electronic biometrics device (EBD) 302 and is modulated to send signals to device 302.

In data collection zone 114 the system senses the presence of a vehicle and instructs its driver to enter biometric data using sensor equipment, or devices, located within the vehicle. As shown in FIG. 2, a radio frequency (RF) transmitter 202 optionally but preferably is mounted on mount 204. Mount 204 preferably extends across the data zone 114, but alternatively may be mounted adjacent to the data collection zone 114. The transmitter 202 emits an RF signal via a directional antenna, contained within transmitter 202, pointed toward the ground. Vehicles passing through collection zone 114 thus are illuminated by the RF energy.

When a vehicle enters data collection zone 114, VPAS attempts to identify the vehicle. This can be done through a number of industry standard means including identification by interrogating electronics within the vehicle, reading the license plates, collecting visual or thermal images of the vehicle, or sensing other forms of vehicle identification such as invisible ultraviolet or infrared reflectors painted on the vehicle's surface. When properly applied with antireflection coating in the visible range, these markings are not apparent to the casual observer. Such markings provide a means of covert vehicle identification. To read the markings a vehicle is scanned in a manner similar to radar, transmitting the appropriate optical wavelength. The location of the marking, and the data encoded in the marker's bit pattern, can then be correlated with other vehicle image information to confirm the vehicle's identity. It is also feasible to use vehicle transponder systems with antennas buried under the road surface.

In some security applications, vehicles are suitably equipped with special identification and communications equipment. Only those vehicles would be granted access authorization automatically. In other cases no restrictions as to the type of vehicles may apply. The nature of vehicle restrictions directs the selection of the vehicle identification mechanisms used. At a minimum, some form of advisory is needed to prevent oversized vehicles from damaging the security systems physical structure.

If a vehicle is not equipped with any form of VPAS identification technology, VPAS images the vehicle in order to track it as it passes through the system. When imaging is used for vehicle identification, a temporary vehicle digital ID is created that is used to track the vehicle as it passes through the system. This allows VPAS to associate a vehicle with the results of specific biometric analyses. To ease the complexity of VPAS, data collection zone 114 uses lanes that confine vehicles to specific lanes. Each vehicle remains in a given lane through reaction zone 120. The data is communicated via wireless means to the VPAS computer system for analysis. Collection and communications of the biometric and vehicle data is completed while the vehicle is within analysis zone 116.

To assist in the authorization process, long range facial images preferably are collected. This can be done either by visual or thermal imaging—both of which are commercially available. Thermal imaging can be a map of thermal characteristics or discrete blood vessel detection methodology using patented technology from Irid, Inc of Springfield, Va. The Irid, Inc. approach supports high accuracy facial recognition at distances of at least 50 feet. In VPAS, the Irid infrared camera is used at a closer distance, taking images as the vehicle enters data collection zone 114. A large angular view of the vehicle can be imaged from this vantage point. Pattern recognition software isolates faces within the field of view for biometric analysis.

While a vehicle is within analysis zone 116, the computer system conducts authorization analysis of its data as discussed in the patent application referenced above. In clearance zone 118 the driver is informed of the results of the computer's analysis. The vehicle may be authorized to proceed, denied access, or provided other information related to system operations and the results of data analysis. In reaction zone 120 the driver has an opportunity either to exit the system via exits 122a or 122b, or proceed to lane selection zone 124. In lane selection zone 124, the driver maneuvers the vehicle to aim at a lane 126 in lane zone 128. The driver may choose a lane 126 or he or she may be directed to a specific lane by the system while passing through lane selection zone 124. The driver's selection of a lane 126 puts the vehicle in a constrained path whereby the vehicle cannot change lanes once it enters lane zone 128. The lane specific constraint continues until the vehicle reaches secured area 104.

The advisory zone 130 contains messaging devices to inform the driver of the final status of his authorization. Containment zone 132 is where unauthorized vehicles can be arrested and contained, or allowed to pass through. If an unauthorized vehicle enters containment zone 132, it can be contained within containment zone 132 until a security response team is able to address the situation. The lanes in containment zone 132 are equipped for remote monitoring and communication with the vehicle's driver. As a function of the threat posed by an unauthorized vehicle, the vehicle may be released to proceed into secured area 104 under control of the team. This ensures capture of violators as required.

FIG. 3 shows an electronic biometrics device (EBD) 302 mounted in the cabin of vehicle 304. The EBD (302)

preferably is powered from a power source within the vehicle, but alternatively may be activated passively by an external energy source such as transmitter 202. EBD 302 includes a passive radio frequency receiver 306, which receives RF signal emitted by transmitter 202. This received energy is converted electronically into a small amount of electrical power sufficient to operate fingerprint reader 308 and electronics package 310. EBD 302 receives RF energy from transmitter 202 and receiver 306 converts the energy into useful power. When sufficient power has been accumulated, receiver 306 activates electronics package 310. Electronics package 310 contains low power logic circuitry and devices that perform a number of functions. Electronic package 310 drives device 312 which is used to alert the vehicle passenger that biometrics data entry is required. Device 312 optionally but preferably is a low powered sonic alert. The alert also can be produced by connecting an electrical output of electronics package 310 to other systems within the vehicle.

Electronics package 310 then activates a low powered LCD display 314. The LCD display 314 is used to inform the passenger of steps to be taken. Fingerprint reader 308 contains one or more fingerprint reader pads 316. The passenger is prompted to place his or her fingers on the fingerprint pads 316 of fingerprint reader 308. Alternatively, fingerprint reader 308 may contain a single input pad 316 and the passenger can be prompted to enter multiple fingerprints from different fingers in a series of input measurement procedures. Electronics package 310 contains a radio transmitter that transmits via antenna 318. The antenna 318 preferably is mounted physically within the case of the EBD 302, but alternatively may be mounted externally.

Once fingerprint data has been read by reader 308, the data is processed by logic within Electronics package 316 and is transmitted to a receiver located within or near transmitter 202. The transmitted signal also contains identification information to uniquely identify the EBD 302. From the receiver within or near transmitter 202, the data transmitted by EBD 302 is communicated to a control processor associated with the authorization and verification activities of the VPAS 100.

EBD 302 preferably is equipped with a microphone 320 that is used to sample the voice of the passenger. The voice sample can be collected by the EBD 302 before, during or after reading the fingerprints. The passenger is alerted and prompted by devices 52 and 79 in a manner similar to the procedure described above for fingerprint reading procedures. The voice sample is processed by logic in electronics package 310 and transmitted to a control processor associated with the authorization and verification procedures.

The logic of the electronics package 310 can be based on hardwired or preprogrammed logic, or software running on a microprocessor. The electronics package 310 can also be reprogrammed through external electronic contacts or via secure data communications using radio signals via antennas 306 and 318. For the passenger to be verified or authenticated by the VPAS 100, the passenger previously must have been enrolled in the VPAS system. Enrollment involves recording the fingerprints and voice patterns in advance and storing them at a suitable location for subsequent comparisons when validating the passenger identity. The fingerprint and voice data can be transmitted via antenna 318 either in compressed or uncompressed data formats. The information can also be preprocessed to form industry standard biometrics templates before being transmitted to reduce the amount of data that must be transmitted.

Figure 4:
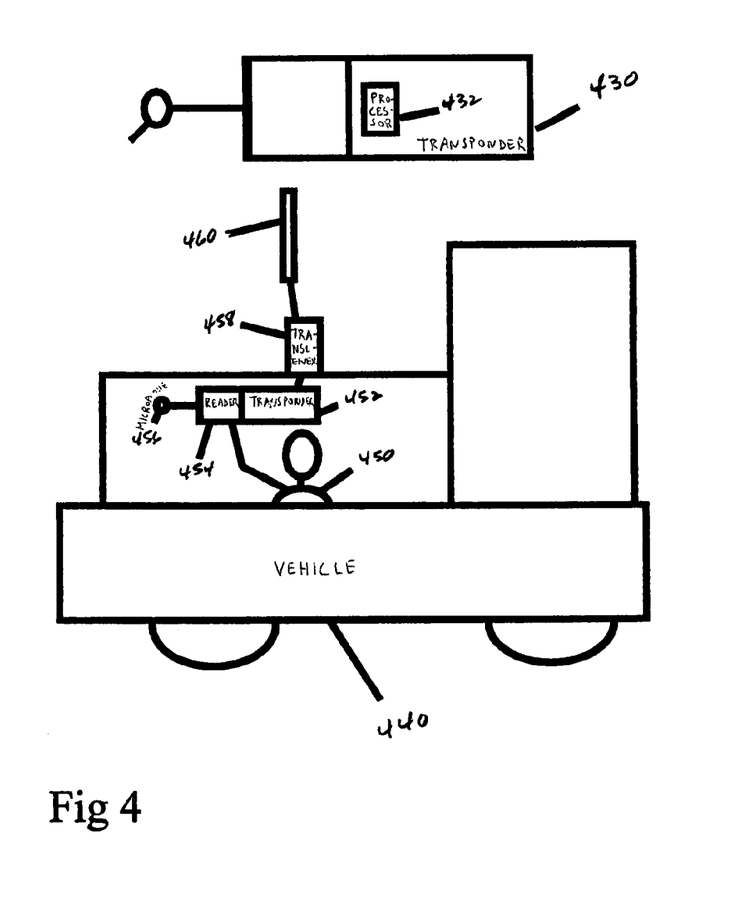
FIG. 4 shows a simplified vehicle passenger authorization system.

An alternative approach to VPAS uses a reduced complement of physical constraints. The concept is to maintain personnel in position to administer traffic flow, but allow authenticated personnel to drive past security check points without having to come to a complete stop. As shown in FIG. 4, the biometrics transponder in the vehicle communicates wirelessly with a computer 402 locally to determine suitability of the driver-vehicle combination to pass through a checkpoint 420. Simple RED and GREEN signal lights 404 and 406, respectively, can be used to advise drivers of their authorization status. The signal lights can include arrows indicating lane changes required based on the authorization analysis by the computer.

The transponder 430 can be powered using external RF as the power source as described for EBD 302 or be powered via internal battery or electrical power from the vehicle. It also can be powered with a combination of 2 or 3 of these sources whereby the user has an option. If a battery is used, the other 2 sources can be used to recharge the internal battery.

Figure 5:
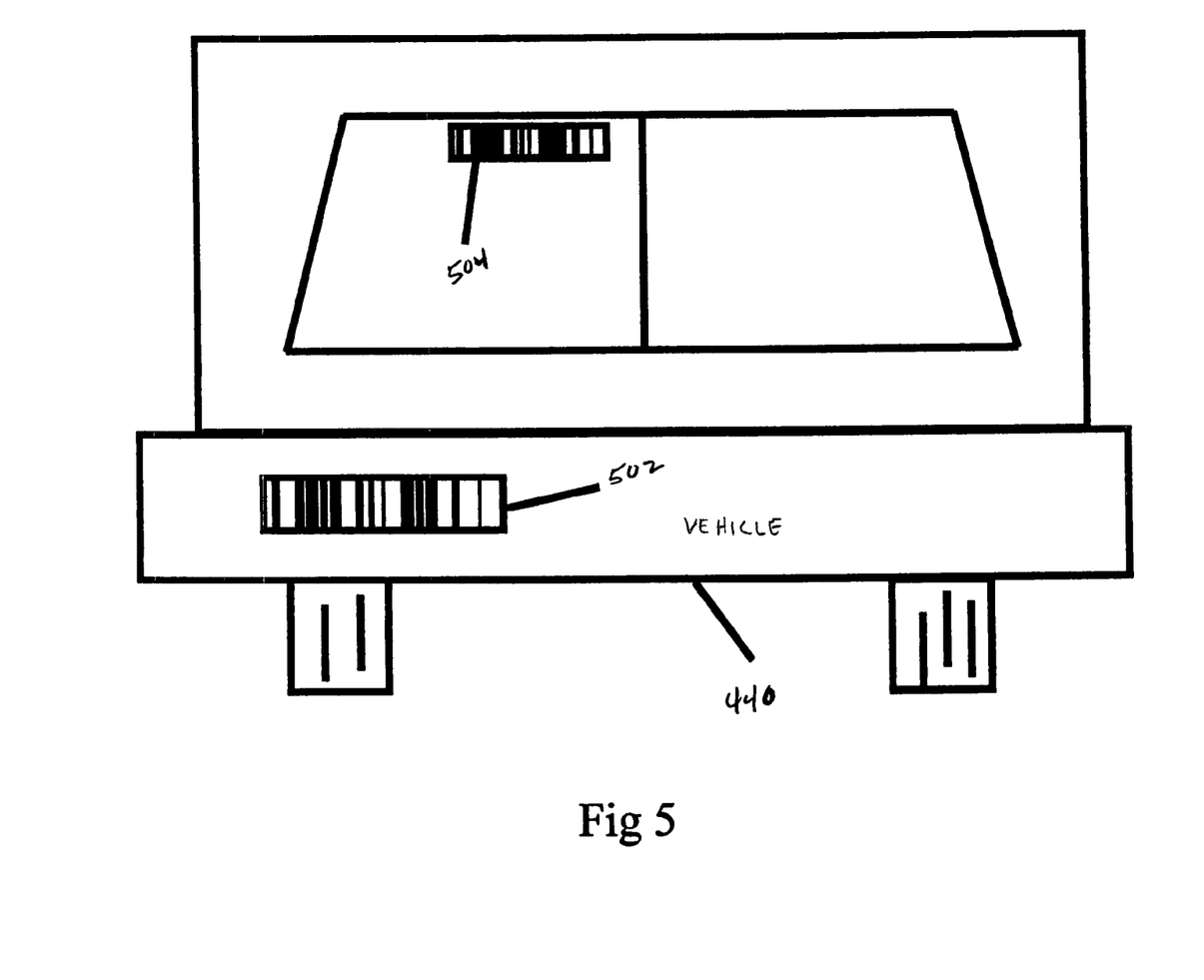
FIG. 5 shows the positioning of optional barcode stickers used for identifying vehicles.

The vehicle 440 preferably is equipped with an identification tag such as barcode strips 502 or 504 in FIG. 5. Barcode reader 408 reads an approaching vehicle and verifies whether the vehicle is authorized (pre-registered) to enter checkpoint 420. The driver 450 approaches the checkpoint 419 and must enter biometrics information into transponder 430. This can be done by placing a finger on the transponder 452 fingerprint reader 454. Another biometric input can be voice via microphone 456.

Processor 432 collects the biometrics data and transmits it to computer 402 via a wireless link which includes transceiver 458, antenna 410, antenna 462 and transceiver 464. Computer 402 maintains a database of authorized personnel and compares the received biometrics data with its records to determine if the driver 450's biometrics data matches a record in computer 402 and the vehicle is also recognized as having a valid ID, the GREEN signal light 406 is illuminated informing the driver 450 to proceed. If either the vehicle or the driver cannot be matched by computer 402, RED signal light 404 is illuminated.

An alternative embodiment of VPAS 100 requires that the driver 450 be both recognized as having a valid biometrics data file and be associated with the vehicle. If the vehicle and driver are not associated in the records of computer 402, RED light 404 is illuminated. Multiple drivers can be associated with a given vehicle. Also, a driver can be associated with multiple vehicles. Also, some drivers can be authorized independent of what vehicle is being driven. Furthermore, certain vehicles can be authorized to proceed regardless of who the driver is or whether the driver enters biometrics data or not. Requiring driver biometrics to match vehicle identification helps prevent compromises of the system. If the transponder is stolen, it will not be useful for gaining access through checkpoint 420 unless the associated vehicle is being driven.

To further enhance the resistance to compromises, the transponder can require the driver 450 to enter more than one biometric such as voice plus fingerprint or prints from more than one finger. To activate the transponder can require entry of a PIN number or code known independently by the driver. To further enhance resistance to compromise, the transponder can use encrypted processing of the biometrics data before transmitting the data wirelessly. The encryption key for the processing can be provided by computer 402 via the wireless link in real time. Transponder 403 can also preprocess the biometrics data to reduce the data that is transmitted to computer 402. The processing executed by the transponder is embedded in a microprocessor inaccessible electrically once the processor is factory programmed. Another aid to the processing can require that the driver 450 be biometrically enrolled in advance with the biometric information being encoded, encrypted and stored in the transponder's inaccessible memory.

CONCLUSION

While various embodiments of the present invention have been described above, it should be under-stood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A system for verifying whether a vehicle and its occupants are authorized to enter a secure area, comprising:
   a multi-zone staging area preceding the secure area and having two or more lanes in which vehicles may travel;
   a means for delivering information to occupants in the vehicle;
   a means for collecting identifying information from the vehicle while the vehicle is moving through said multi-zone staging area;
   a means for collecting identifying information from the occupants in the vehicle while the vehicle is moving through said multi-zone staging area; and
   a means for communicating the information collected by said means for collecting identifying information from the vehicle and the information collected by said means for collecting identifying information from the occupants in the vehicle to a processing center for analysis; wherein the vehicle and its occupants are identified while the vehicle is moving through the multi-zone staging area such that information required to decide whether the vehicle and its occupants are authorized to enter the secure area is collected and analyzed without requiring the vehicle to stop in said multi-zone staging area, and wherein said multi-zone staging area comprises:
   a data collection zone for gathering the identifying information from the vehicle and the identifying information from the occupants in the vehicle; and
   a clearance zone for informing the occupants whether the vehicle is permitted to pass to the secure area.

2. The system of claim 1, further comprising a means for sensing the vehicle's presence as it enters said multi-zone staging area.

3. The system of claim 1, further comprising a means for regulating traffic flow through said multi-zone staging area.

4. The system of claim 1, wherein said means for delivering information to occupants in the vehicle is selected from the group consisting of an LCD display mounted in the vehicle, an audio playback device, a video clip and an outdoor electric sign.

5. The system of claim 1, wherein said means for delivering information to occupants in the vehicle is selected from the group consisting of an LCD display mounted inside the vehicle, an audio playback device, and an outdoor electronic sign.

6. The system of claim 1, wherein the identifying information from the vehicle is selected from the group consisting of a license number, a barcode, interrogating electronics within the vehicle, visual images of the vehicle, thermal images of the vehicle, ultraviolet reflectors on the vehicle, and infrared reflectors on the vehicle.

7. The system of claim 1, wherein the identifying information from the occupants in the vehicle is biometric information.

8. The system of claim 7, wherein said biometric information is selected from the group consisting of fingerprints, voice patterns, images of the occupants' iris, and facial images.

9. The system of claim 8, wherein said facial images are visual images.

10. The system of claim 8, wherein said facial images are infrared images.

11. A method for authorizing a vehicle and its occupants to enter a secure area, comprising the steps of:
    (a) collecting identifying information from the vehicle while the vehicle is moving through a multi-zone staging area preceding the secure area;
    (b) collecting identifying information from the occupants in the vehicle while the vehicle is moving through the multi-zone staging area preceding the secure area;
    (c) transmitting the identifying information from said steps (b) and (c) to a processing center for analysis; and
    (d) informing the occupants in the vehicle of whether the vehicle is permitted to pass into the secure area; wherein the vehicle and its occupants are identified while the vehicle is moving through the multi-zone staging area such that information required to decide whether the vehicle and its occupants are authorized to enter the secure area is collected and analyzed without requiring the vehicle to stop in said multi-zone staging area, and wherein the multi-zone staging area of said step (a) comprises a data collection zone for gathering the identifying information of said steps (a) and (b), and a clearance zone for informing the occupants whether the vehicle is permitted to pass to the secure area.

12. The method of claim 11, further comprising the step of:
    (e) delivering instructions to the occupants in the vehicle for providing the identifying information of said step (b).

13. The method of claim 12, wherein said step (e) is performed using an LCD display mounted inside the vehicle, an audio playback device, or an outdoor electronic sign.

14. The method of claim 11, wherein the identifying information of said step (a) is selected from the group consisting of a license number, a barcode, interrogating electronics within the vehicle, visual images of the vehicle, thermal images of the vehicle, ultraviolet reflectors on the vehicle, and infrared reflectors on the vehicle.

15. The method of claim 11, wherein the identifying information of said step (b) is biometric information.

16. The method of claim 15, wherein said biometric information is selected from the group consisting of fingerprints, voice patterns, images of the occupants' iris, and facial images.

17. The method of claim 16, wherein said facial images are visual images.

18. The method of claim 16, wherein said facial images are infrared images.

* * * * *